US012031774B2

(12) United States Patent
Chieda et al.

(10) Patent No.: US 12,031,774 B2
(45) Date of Patent: Jul. 9, 2024

(54) GAS BLOWOFF NOZZLE AND FURNACE, AND METHOD FOR MANUFACTURING COATED FILM

(71) Applicant: Toray Industries, Inc., Tokyo (JP)

(72) Inventors: Shigeki Chieda, Otsu (JP); Toru Nishikawa, Otsu (JP); Fumiyasu Nomura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 794 days.

(21) Appl. No.: 16/977,869

(22) PCT Filed: Feb. 22, 2019

(86) PCT No.: PCT/JP2019/006877
§ 371 (c)(1),
(2) Date: Sep. 3, 2020

(87) PCT Pub. No.: WO2019/187861
PCT Pub. Date: Oct. 3, 2019

(65) Prior Publication Data

US 2021/0364236 A1 Nov. 25, 2021

(30) Foreign Application Priority Data

Mar. 29, 2018 (JP) ................................ 2018-064727

(51) Int. Cl.
*F26B 21/00* (2006.01)
*B05B 1/04* (2006.01)

(52) U.S. Cl.
CPC ............ *F26B 21/004* (2013.01); *B05B 1/044* (2013.01)

(58) Field of Classification Search
CPC ........ F26B 21/004; F26B 13/00; F26B 21/00; B05B 1/044; B05B 1/005; B05B 12/18
See application file for complete search history.

(56) References Cited

U.S. PATENT DOCUMENTS 4,347,960 A 9/1982 Gageur
2004/0181967 A1 9/2004 Fujinami et al.
(Continued)

FOREIGN PATENT DOCUMENTS

CN 1526569 A 9/2004
CN 2767477 Y 3/2006
(Continued)

OTHER PUBLICATIONS

Extended European Search Report for European Application No. 19 774 574.8, dated Jun. 22, 2021, 9 pages.
(Continued)

*Primary Examiner* — Qingzhang Zhou
(74) *Attorney, Agent, or Firm* — Buchanan, Ingersoll & Rooney PC

(57) ABSTRACT

A gas blowoff nozzle includes: a casing including a gas blowoff face that blows off gas; a gas supply port provided to one end of the casing and supplying gas along the longitudinal direction of the nozzle; and a pressure equalizing chamber communicating with the gas supply port and the gas blowoff face, and including a partition plate including a plurality of tubular bodies having orifices on both ends. In each of the tubular bodies, an angle θ that a wall surface on a side closer to the gas supply port forms with the partition plate is 55° to 120° as an interior angle in a sectional shape of each of the tubular bodies. A gas circulation hole is provided on a face of each of the tubular bodies that comes into contact with the partition plate, the gas circulation hole passing through the face and the partition plate.

10 Claims, 6 Drawing Sheets

(56) References Cited

U.S. PATENT DOCUMENTS

| | | | | |
|---|---|---|---|---|
| 2010/0059036 | A1 | 3/2010 | Inoue et al. | |
| 2012/0210599 | A1 | 8/2012 | Inoue et al. | |
| 2017/0227286 | A1* | 8/2017 | Schmit .................... | F26B 21/12 |

FOREIGN PATENT DOCUMENTS

| | | | |
|---|---|---|---|
| CN | 204202331 | U | 3/2015 |
| CN | 106003679 | A | 10/2016 |
| DE | 2733347 | A | 2/1979 |
| EP | 2706316 | A2 | 3/2014 |
| GB | 1509131 | A | 4/1978 |
| GB | 1558548 | | 1/1980 |
| GB | 2193146 | A | 2/1988 |
| JP | 56126442 | A | 10/1981 |
| JP | 2012225642 | A | 11/2012 |
| JP | 2014052173 | A | 3/2014 |
| KR | 101229347 | B1 | 2/2013 |
| WO | 2008114586 | A1 | 9/2008 |
| WO | 2017042433 | A | 3/2017 |

OTHER PUBLICATIONS

Chinese Office Action for Chinese Application No. 201980017882.3, dated Jun. 22, 2021, with translation, 8 pages.

International Search Report and Written Opinion for International Application No. PCT/JP2019/006877, dated May 14, 2019, 5 pages.

* cited by examiner (a)

(b)

GAS BLOWOFF NOZZLE AND FURNACE, AND METHOD FOR MANUFACTURING COATED FILM

CROSS REFERENCE TO RELATED APPLICATIONS

This is the U.S. National Phase application of PCT/JP2019/006877, filed Feb. 22, 2019, which claims priority to Japanese Patent Application No. 2018-064727, filed Mar. 29, 2018, the disclosures of these applications being incorporated herein by reference in their entireties for all purposes.

FIELD OF THE INVENTION

The present invention relates to a gas blowoff nozzle used for blowing gas on a surface of a resin film, a furnace provided with the gas blowoff nozzle, and a method for manufacturing a coated film.

BACKGROUND OF THE INVENTION

In a manufacturing process of coated films in which surface treatment is applied to resin films, for example, a liquid is applied to an overlength or a web of resin film roll, and thereafter, gas such as air or nitrogen is blown on the surface of the resin film while the resin film is being conveyed in the interior of a furnace such as a drying furnace in some cases. Generally, when gas is blown on a resin film being conveyed, a gas blowoff nozzle is often used that extends in a direction orthogonal to the conveying direction of the resin film, in other words, in the width direction of the resin film, and that blows off gas vertically toward the surface of the resin film. To a gas blowoff nozzle that extends in the width direction of a film, gas is supplied in the width direction of the film (in other words, the longitudinal direction of the nozzle).

Such a gas blowoff nozzle bends gas supplied in the longitudinal direction of the nozzle to a direction orthogonal to the supplying direction, and blows the gas on a resin film. A baffle or the like is provided in the nozzle in order to change the direction of the airflow. However, gas colliding with the baffle sometimes generates turbulent airflow, which scratches a resin film on which the gas is blown. As a gas blowoff nozzle that prevents such scratches and blows a uniform airflow, Patent Literature 1 discloses a gas blowoff nozzle having an uneven surface cover on which projections and depressions are alternately provided along the longitudinal direction of the gas blowoff nozzle (in other words, the width direction of work), and that is formed in a wavy or zigzag shape. The section of the uneven surface cover along the longitudinal direction of the nozzle has the shape of a triangular wave. This gas blowoff nozzle has a nozzle box in which a face opposing work is a gas blowoff face, and slitted orifices that are provided inside the nozzle box, that extend in the width direction of work, and through which gas passes toward the gas blowoff face. The uneven surface cover is provided so as to cover the orifices inside the nozzle box. The uneven surface covers the orifices and has the sectional shape of a triangular wave, so that gas can flow from an end side (lateral side of the cover) of the uneven surface cover in a direction orthogonal to the longitudinal direction of the nozzle (the width direction of the gas blowoff nozzle) toward the orifices. Furthermore, a gap is formed between the uneven surface cover and an interior wall of the nozzle box in the width direction of the nozzle. Gas that has been supplied to the gas blowoff nozzle flows from this gap to the lateral side of the uneven surface cover, flows into a space between the uneven surface cover and the orifices, and further through the orifices, is blown off from the gas blowoff facing the work. Patent Literature 1 also discloses that a space between the orifices and the gas blowoff face is to be a stabilizing chamber or a pressure equalizing chamber for stabilizing the airflow. Patent Literature 2 also discloses a gas blowoff nozzle having an uneven surface cover. In the gas blowoff nozzle described in Patent Literature 2, the uneven surface cover has the sectional shape of a sine wave or a trapezoid.

PATENT LITERATURE

Patent Literature 1: Japanese Laid-open Patent Publication No. 56-126442

Patent Literature 2: Specification of Publication after Examination of British Patent Application No. 1558548

SUMMARY OF THE INVENTION

Characteristics of a coated film manufactured by blowing gas in a furnace such as a drying furnace is affected by thermal hysteresis when passing through the interior of the furnace. In order to obtain a coated film having homogeneous characteristics in the width direction of the film, heat exchange between the gas jetted out of the gas blowoff nozzle and the resin film is required to be uniform in the width direction of the resin film. Consequently, the gas blowoff nozzle needs a flow straightening mechanism that keeps the gas blowoff velocity constant along the width direction of the resin film.

Incidentally, gas blowoff nozzles to which gas to be blown off is supplied from the width direction of the film, in other words, the longitudinal direction of the nozzle include a type to which gas is supplied from both sides in the longitudinal direction of the nozzle and a type to which gas is supplied from only one side in the longitudinal direction of the nozzle. As is the case with Patent Literatures 1 and 2, in gas blowoff nozzles to which gas is supplied from only one side in the longitudinal direction of the nozzle, a phenomenon occurs in which the gas blowoff velocity at a position on a side opposite to the side of supplying gas with respect to the longitudinal direction of the nozzle is higher than the gas blowoff velocity on the side of supplying gas. Although the gas blowoff nozzles presented in Patent Literatures 1 and 2 are capable of preventing local turbulent airflow from being generated, it cannot be considered that the gas blowoff velocity is not sufficiently uniform along the longitudinal direction of the nozzle.

It is an object of the present invention to provide a gas blowoff nozzle that is used for blowing gas on a resin film, and the gas blowoff velocity of which is uniform along the longitudinal direction of the nozzle, a furnace provided with such a gas blowoff nozzle, and a method for manufacturing a coated film that uses such a gas blowoff nozzle.

As a result of experiments and simulations, the present inventors have found that, in a case in which an uneven surface cover is used that has the sectional shape of a triangular wave as presented in Patent Literature 1, the velocity of the airflow flowing along a slope facing a gas supply port, of two adjacent slopes constituting the uneven surface cover, is higher than the velocity of the airflow flowing along a slope not facing the gas supply port, and, from this fact, have considered an optimum angle for the tilt of the slopes and uniformity of the gas blowoff velocity along the longitudinal direction of the nozzle, thereby accomplishing the present invention.

A gas blowoff nozzle according to the present invention is used for blowing gas on a surface of a resin film, the gas blowoff nozzle including: a casing provided such that a longitudinal direction of the gas blowoff nozzle extends in a width direction of the resin film, the casing including, on a lateral face thereof opposing the resin film, a gas blowoff face that blows off gas; a gas supply port provided to one end of the casing, the gas supply port supplying gas along the longitudinal direction of the nozzle; and one or more pressure equalizing chambers communicating with the gas supply port and the gas blowoff face, wherein one pressure equalizing chamber of the one or more pressure equalizing chambers includes a partition plate constituting a face on a side of the gas blowoff face, the partition plate including a plurality of tubular bodies arranged on the partition plate along the longitudinal direction of the nozzle such that an axial direction of each of the tubular bodies is orthogonal to the longitudinal direction of the nozzle, each of the tubular bodies having orifices on both ends, in each of the tubular bodies, an angle θ that a wall surface on a side closer to the gas supply port, out of wall surfaces that rise from the partition plate, forms with the partition plate is 55° to 120° as an interior angle in a sectional shape of each of the tubular bodies, and a gas circulation hole is provided on a face of each of the tubular bodies that comes into contact with the partition plate, the gas circulation hole passing through the face and the partition plate.

A furnace according to the present invention includes the gas blowoff nozzle according to the present invention, and applies heating treatment by blowing heating gas from the gas blowoff nozzle to a resin film.

A method for manufacturing a coated film according to the present invention includes blowing gas to a surface of a resin film by using the gas blowoff nozzle according to the present invention.

In the method for manufacturing a coated film of the present invention, the gas is preferably heating gas.

In the method for manufacturing a coated film of the present invention, the difference between the maximum value and the minimum value of the blowoff velocity with respect to the average blowoff velocity is preferably within 11% in the distribution of the velocity blowing off the gas along the longitudinal direction of the nozzle.

According to the present invention, the gas blowoff nozzle can be obtained in which the velocity of flow of gas blowing off from the gas blowoff face is uniform along the longitudinal direction of the nozzle. The furnace provided with this gas blowoff nozzle is used to apply heating treatment to the resin film, whereby a coated film can be obtained that has homogeneous characteristics along the width direction of the film.

DETAILED DESCRIPTION OF EMBODIMENTS OF THE INVENTION

Preferred embodiments of the present invention will be described next with reference to the drawings. Before a gas blowoff nozzle based on the present invention is described, a general gas blowoff nozzle will be described using FIG. 1.

Figure 1:
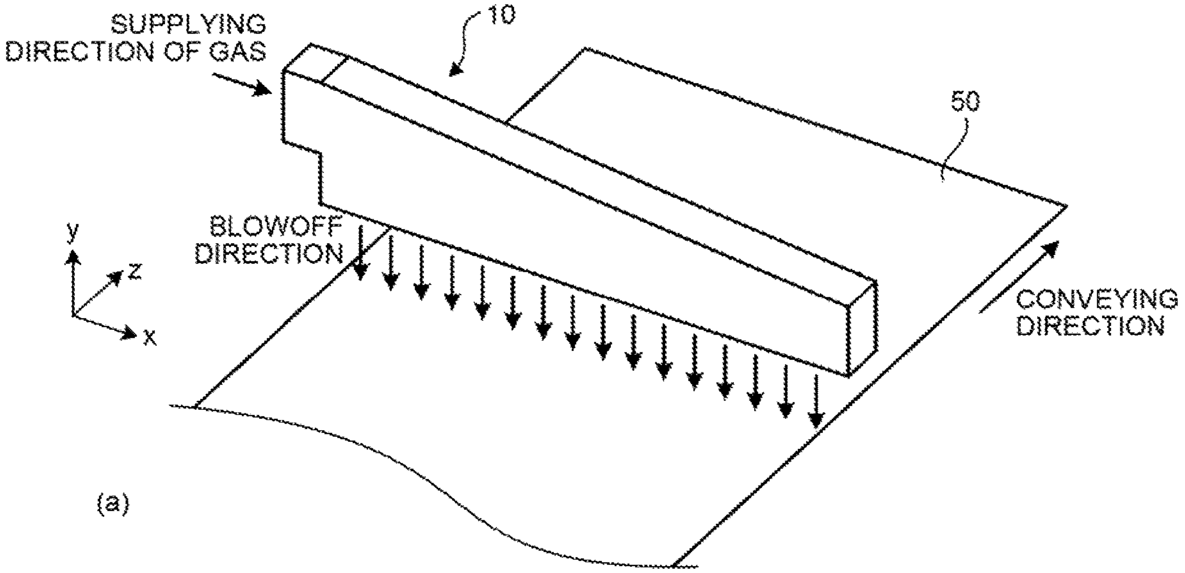
FIG. 1 are views illustrating a general gas blowoff nozzle; (a) is a perspective view, and (b) is a section view.
Figure 1:
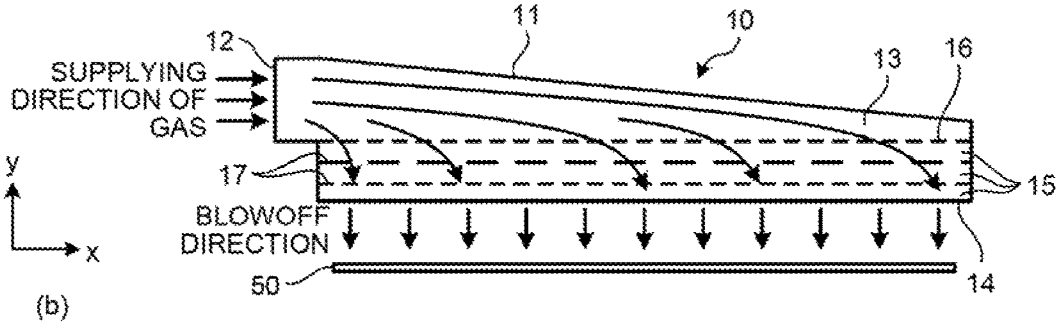

A gas blowoff nozzle 10 illustrated in FIG. 1 is used for blowing gas, such as air, on a surface of a resin film 50 conveyed inside a furnace, in the interior of the furnace such as a drying furnace or a tenter oven for drawing processing, for example. Think of an xyz orthogonal coordinate system in which the conveying direction of the resin film 50 is the direction of the z axis, and the width direction of the resin film 50 orthogonal to the conveying direction of the film is the direction of the x axis as illustrated in FIG. 1(*a*). The direction of the y axis is the height direction of the gas blowoff nozzle 10. The gas blowoff nozzle 10 is provided in such a manner as to extend in the width direction of the film, in other words, the direction of the x axis, across the full width of the resin film 50 while keeping a spacing with respect to the resin film 50. Consequently, the longitudinal direction of the nozzle is also the direction of the x axis. The gas blowoff nozzle 10 has gas supplied from one side of the longitudinal direction of the nozzle (the direction of the x axis), as illustrated as "supplying direction of gas" in FIG. 1(*a*), and blows off the gas across the full width of the resin film 50, in a direction perpendicular to the surface of the resin film 50, in other words, parallel to the y axis, as illustrated as "blowoff direction". A direction that is orthogonal to the longitudinal direction of the nozzle and that is parallel to the resin film 50 (in other words, the z direction) is referred to as the width direction of the nozzle.

FIG. 1(*b*) illustrates a sectional structure of the gas blowoff nozzle 10 in a direction that is parallel to the longitudinal direction of the nozzle and that is perpendicular to the surface of the resin film 50. The gas blowoff nozzle 10 has a casing 11 the longitudinal direction of which extends in the width direction of the resin film 50, and the left end of the casing 11 in the drawing has a gas supply port 12 provided thereto. In the interior of the casing 11, an upper pressure equalizing chamber 13 is formed being connected to the gas supply port 12. The height of the upper pressure equalizing chamber 13 is decreased with distance from the gas supply port in the longitudinal direction of the nozzle. In other words, the upper pressure equalizing chamber 13 is formed in a tapered shape. In the gas blowoff nozzle 10, a face opposing the surface of the resin film 50 is a gas blowoff face 14. Between the upper pressure equalizing chamber 13 and the gas blowoff face 14, three lower pressure equalizing chambers 15 are provided. In FIG. 1(*b*), the gas blowoff nozzle 10 in which the three lower pressure equalizing chambers 15 are provided is illustrated as an example. However, the number of the lower pressure equalizing chambers 15 is not limited thereto. In a case in which a plurality of lower pressure equalizing chambers 15 are provided, these lower pressure equalizing chambers 15 are arranged in the height direction of the gas blowoff nozzle 10, and the lower pressure equalizing chambers 15 are divided from each other by porous and air-permeable partition plates 17 such as perforated metal. Also, the upper pressure equalizing chamber 13 and the lower pressure equalizing chambers 15 are divided by a porous and air-permeable partition plate 16 such as perforated metal. The partition plates 16, 17 are both provided parallel to the surface of the resin film 50, in other words, parallel to the x axis and the z axis. The entire external walls of the upper pressure equalizing chamber 13 and the lower pressure equalizing chambers 15 constitute the casing 11 of the gas blowoff nozzle 10 (in other words, a nozzle casing), and the gas blowoff face 14 is formed on a lateral face of the casing 11 opposing the resin film 50.

Because the porous and air-permeable partition plates 16, 17 are used in the gas blowoff nozzle 10 illustrated in FIG. 1, the gas supply port 12 communicates with the gas blowoff face 14 through the upper pressure equalizing chamber 13 and the lower pressure equalizing chambers 15. Gas that has been supplied to the gas supply port 12 passes through the partition plate 16 while flowing roughly in the x direction illustrated in the drawing in the upper pressure equalizing chamber 13, and enters the lower pressure equalizing chambers 15. Then, the gas further passes through the partition plates 17, thereby gradually changing its flow direction and being blown off from the gas blowoff face 14 as an airflow perpendicular to the surface of the resin film 50.

Figure 2:
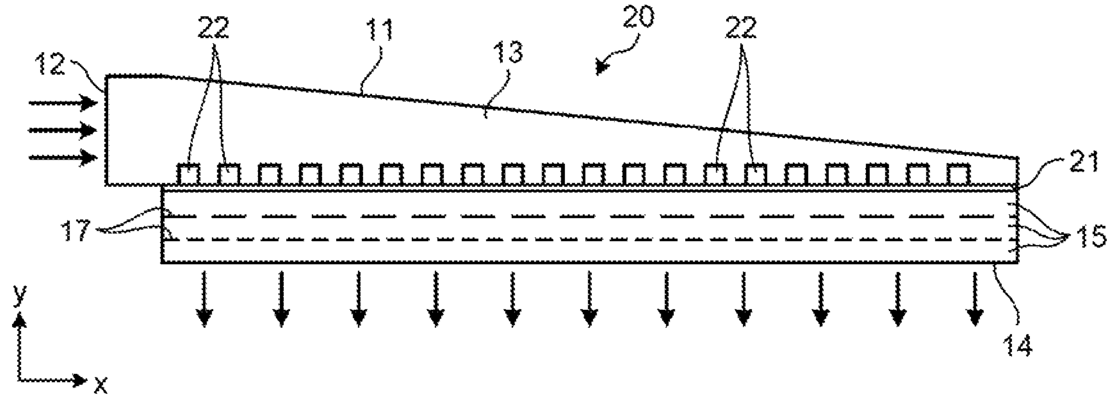
FIG. 2 is a section view illustrating a gas blowoff nozzle according to an embodiment of the present invention.
Figure 3:
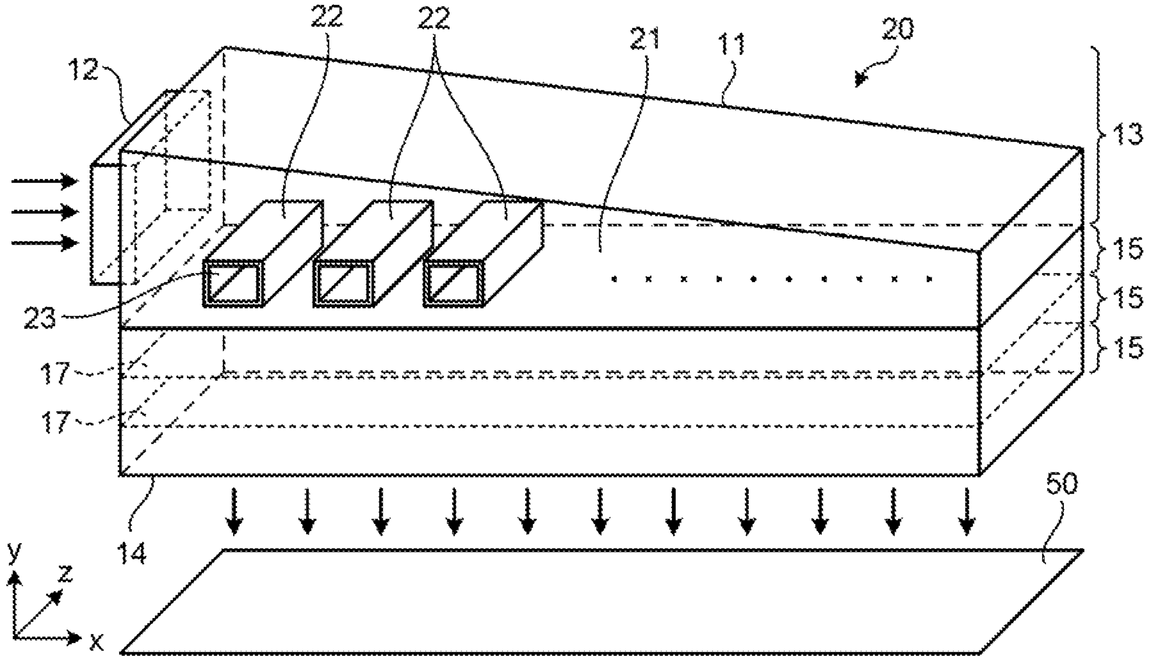
FIG. 3 is a schematic perspective view of the gas blowoff nozzle illustrated in FIG. 2.

A gas blowoff nozzle according to an embodiment of the present invention will be described next. FIG. 2 is a section view of a gas blowoff nozzle 20 according to the embodiment of the present invention. FIG. 3 is a schematic perspective view for illustrating the constitution of the gas blowoff nozzle 20. In the gas blowoff nozzle 20 illustrated in FIG. 2 and FIG. 3, the casing 11, the gas supply port 12, the upper pressure equalizing chamber 13, the lower pressure equalizing chambers 15, and the partition plates 17 have the same structures as those of the gas blowoff nozzle 10 illustrated in FIG. 1. However, the gas blowoff nozzle 20 illustrated in FIG. 2 and FIG. 3 differs from the gas blowoff nozzle illustrated in FIG. 1 in that a partition plate 21 different from the partition plate illustrated in FIG. 1 is used as a partition plate to divide the upper pressure equalizing chamber 13 and the lower pressure equalizing chambers 15, and furthermore, a plurality of tubular bodies 22 are arranged on a face of the partition plate 21 on the upper pressure equalizing chamber 13 side. The partition plate 21 and the tubular bodies 22 will be described in detail below.

The partition plate 21 constitutes a face on the gas blowoff face 14 side of the upper pressure equalizing chamber 13. For the partition plate 21, not a porous material such as perforated metal, but a normal plate member is used. The tubular bodies 22 are arranged in the upper pressure equalizing chamber 13 in such a manner that the axial direction as tubes is the width direction of the nozzle, in other words, the z direction. Assume that the shape of each tubular body 22 cut by a plane orthogonal to the axial direction as a tube is the sectional shape of the tubular body 22, the section of the tubular body 22 has, for example, a polygonal shape such as a triangle or a quadrangle. The sections of the tubular bodies 22 illustrated in FIG. 3 are quadrangular. Both ends of the tubular body 22 as a tube are orifices 23. The length of the tubular body 22 (the length in the width direction of the nozzle) is shorter than the length of the gas blowoff nozzle 20 in the width direction of the nozzle, so that spacings are formed between side walls of the upper pressure equalizing chamber 13 (walls on both end sides in the width direction of the nozzle) and the orifices 23 of the tubular body 22, enabling gas that has been supplied from the gas supply port 12 to flow from the spacings to the interior of the tubular body 22 through the orifices 23. In the tubular body 22, the orifices 23 may have a porous and air-permeable member such as perforated metal or a net (mesh) arranged therein. The direction of a face that each orifice 23 forms is not particularly limited, but the face is preferably parallel to the longitudinal direction of the nozzle and also substantially perpendicular to the partition plate 21.

Figure 4:
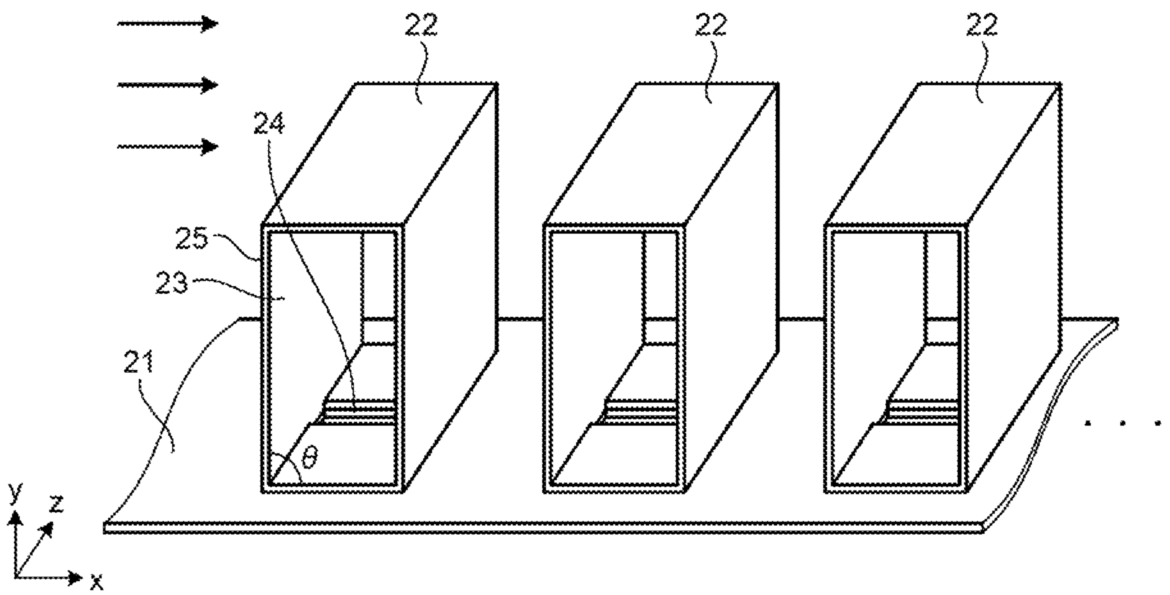
FIG. 4 is a perspective view illustrating an example of a constitution and an arrangement of tubular bodies.

FIG. 4 is a view for illustrating the internal constitution of the tubular bodies 22, and illustrates the partition plate 21 and the tubular bodies 22. The arrows in FIG. 4 illustrate the flow direction of gas supplied from the gas supply port 12 to the upper pressure equalizing chamber 13. For the purpose of illustrating the interior of the tubular bodies 22, the tubular bodies 22 are depicted as having a greater height in FIG. 4 than those illustrated in FIG. 3 do. Nevertheless, the height of the tubular bodies 22 can be set as appropriate as long as they can be housed inside the upper pressure equalizing chamber 13. Thus, it makes no difference to the effect of the present invention being exerted whether the tubular bodies 22 as illustrated in FIG. 3 or the tubular bodies 22 as illustrated in FIG. 4 are used. At a position in the interior of the tubular body 22 and along the center line in the longitudinal direction of the gas blowoff nozzle 20, a gas circulation hole 24 is formed so as to pass through both a face that comes into contact with the partition plate 21 of the tubular body 22, in other words, the underside of the tubular body 22, and the partition plate 21. Although the position of the gas circulation hole 24 does not always need to be along the center line in the longitudinal direction of the gas blowoff nozzle 20, the gas circulation hole 24 is preferably arranged in the center line in the longitudinal direction. The gas circulation hole 24 illustrated in FIG. 4 is formed in a slit shape throughout the full length along the longitudinal direction of the nozzle at the underside of the tubular body 22. Through holes are not formed at positions of the partition plate 21 where the tubular bodies 22 are not provided. As a result, in the gas blowoff nozzle 20, gas that has been supplied from the gas supply port 12 to the upper pressure equalizing chamber 13 flows to the interior of each of the tubular bodies 22 through the respective orifices 23 of the tubular body 22, streams in the lower pressure equalizing chambers 15 through the gas circulation hole 24, and blows off from the gas blowoff face 14.

Because the gas circulation hole 24 is provided for each tubular body 22, on the whole, the partition plate 21 has a plurality of the gas circulation hole 24 arranged in the longitudinal direction of the nozzle. Herein, the gas circulation holes 24 are preferably arranged uniformly along the longitudinal direction of the nozzle. Thus, the tubular bodies 22 are preferably arranged on the partition plate 21 while coming into contact with each other, or arranged at a regular distance from each other in the longitudinal direction of the nozzle.

In the gas blowoff nozzle 20 of the present embodiment, each tubular body 22 has two wall surfaces that rise from the partition plate 21. Of the two wall surfaces, for a wall surface 25 on the gas supply port 12 side, an angle θ that is an interior angle in the sectional shape of the tubular body 22 and that the wall surface 25 forms with the partition plate 21 is preferably about 90°. More specifically, θ is preferably between 55° and 120° inclusive, and between 60° and 110° inclusive, and θ is more preferably between 75° and 95° inclusive. According to the present inventors' consideration, as is evident from examples to be described later, if the angle θ that the wall surface 25 forms with the partition plate 21 falls within the angular range, the velocity distribution of the gas blown off from the blowoff face 14 is uniform throughout the full length in the longitudinal direction of the nozzle.

In the example described above, the tubular bodies 22 are provided in the upper pressure equalizing chamber 13, but a pressure equalizing chamber provided with the tubular bodies 22 is not necessarily limited to the upper pressure equalizing chamber 13. However, the flow straightening effect produced by providing the tubular bodies 22 is expected most in a case in which the tubular bodies 22 are provided in a pressure equalizing chamber adjacent to the gas supply port 12, and thus, the tubular bodies 22 are preferably arranged in the upper pressure equalizing chamber 13. In a case in which the tubular bodies 22 are provided in the upper pressure equalizing chamber 13, the lower pressure equalizing chambers 15 do not always need to be provided in the gas blowoff nozzle 20. The gas blowoff nozzle 20 can also have a constitution in which the partition plate 21 is used as the gas blowoff face 14 to blow gas flowing from the gas circulation hole 24 directly on the resin film 50. However, it is preferable to provide the lower pressure equalizing chambers 15 in the light of the controllability of the gas blowing off from the gas blowoff face 14.

Figure 5:
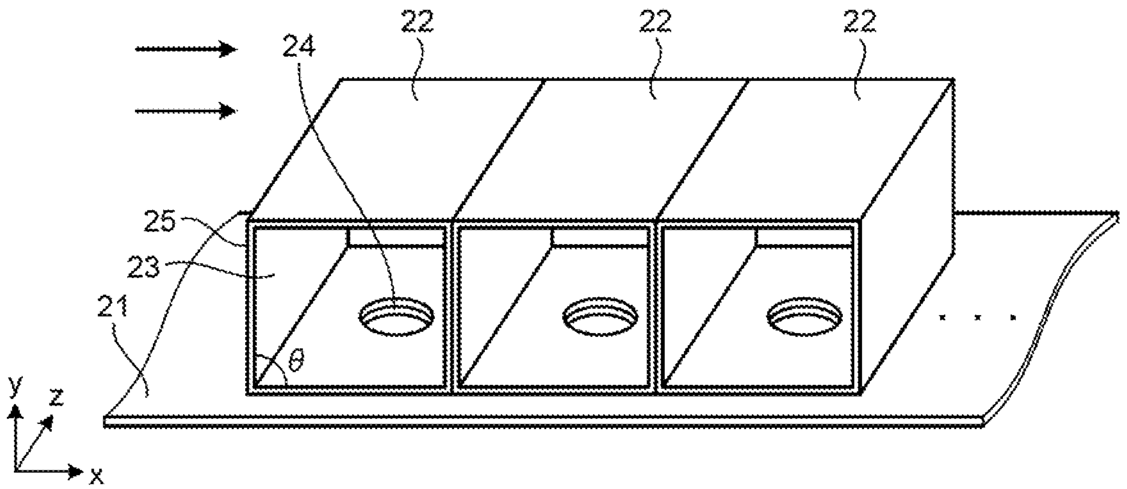
FIG. 5 is a perspective view illustrating an example of a constitution and an arrangement of tubular bodies.

Although FIG. 2, FIG. 3, and FIG. 4 illustrate that the tubular bodies 22 the sections of which are quadrangular are arranged on the partition plate 21 so as to be separated from each other, the constitution and the arrangement of the tubular bodies 22 are not limited thereto. FIG. 5 illustrates another example of a constitution and an arrangement of the tubular bodies 22. In the constitution illustrated in FIG. 5, the tubular bodies 22 the sections of which are quadrangular are arranged so as to come into contact with each other on the partition plate 21 in the longitudinal direction of the nozzle. Each gas circulation hole 24 is formed in a circle at the substantially central part of the underside of the corresponding tubular body 22, and the diameter of the gas circulation hole 24 is shorter than the length of the underside of the tubular body 22 along the longitudinal direction of the nozzle. In each of the tubular bodies 22 illustrated in FIG. 5 also, the angle θ formed by the wall surface 25, among its wall surfaces, that is on the gas supply port 12 side and that rises from the partition plate 21 with the partition plate 21 is between 55° and 120° inclusive, and preferably between 60° and 110° inclusive, and more preferably between 75° and 95° inclusive.

Figure 6:
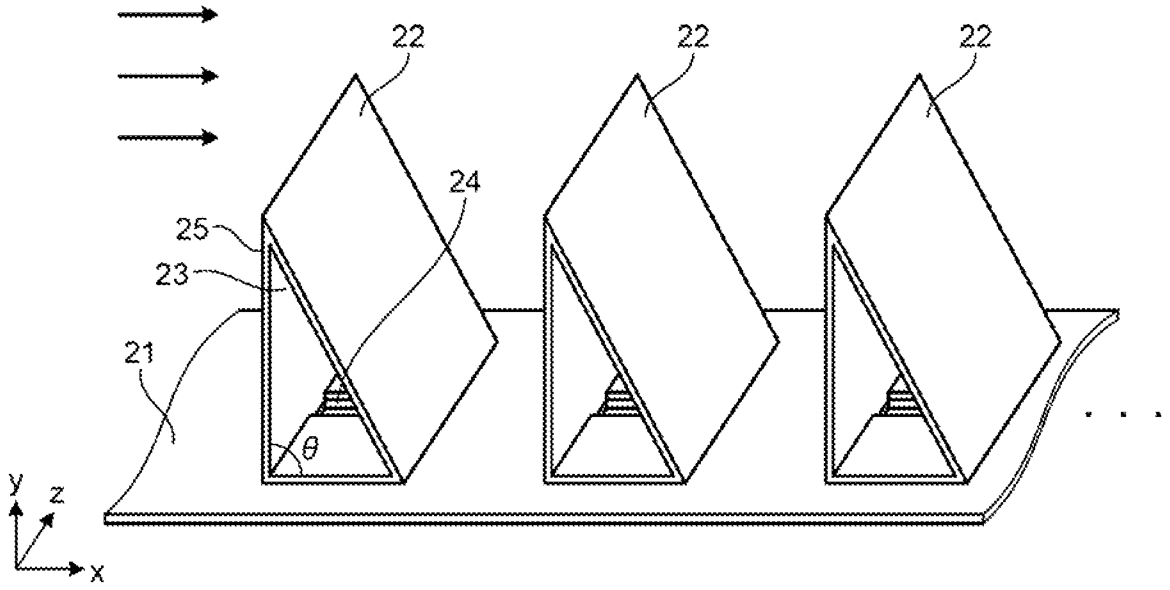
FIG. 6 is a perspective view illustrating an example of a constitution and an arrangement of tubular bodies.

FIG. 6 illustrates still another example of a constitution and an arrangement of the tubular bodies 22. In the constitution illustrated in FIG. 6, the sectional shape of each tubular body 22 is changed from a quadrangle in the constitution illustrated in FIG. 4 to a triangle. In each of the tubular bodies 22 illustrated in FIG. 6 also, the angle θ formed by the wall surface 25, among its wall surfaces, that is on the gas supply port 12 side and that rises from the partition plate 21 with the partition plate 21 is between 55° and 120° inclusive, and preferably between 60° and 110° inclusive, and more preferably between 75° and 95° inclusive.

Figure 7:
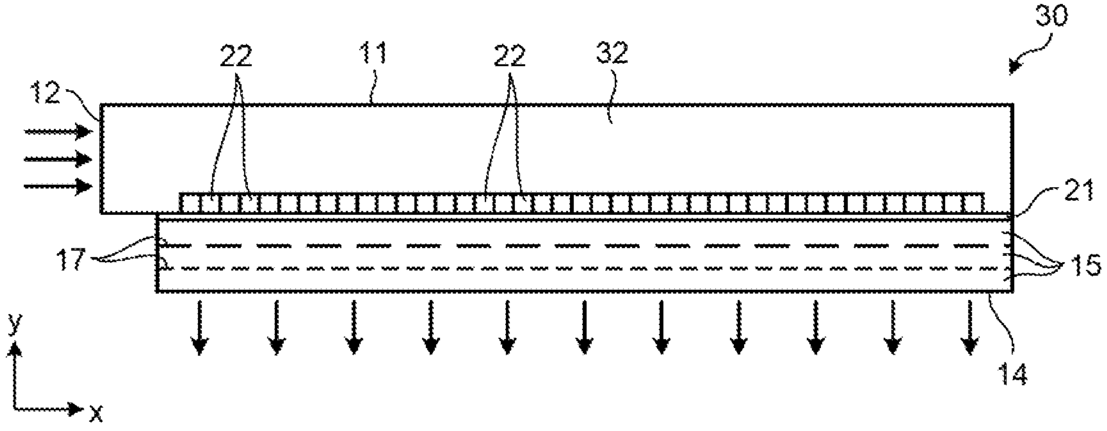
FIG. 7 is a section view illustrating a gas blowoff nozzle according to another embodiment of the present invention.
Figure 8:
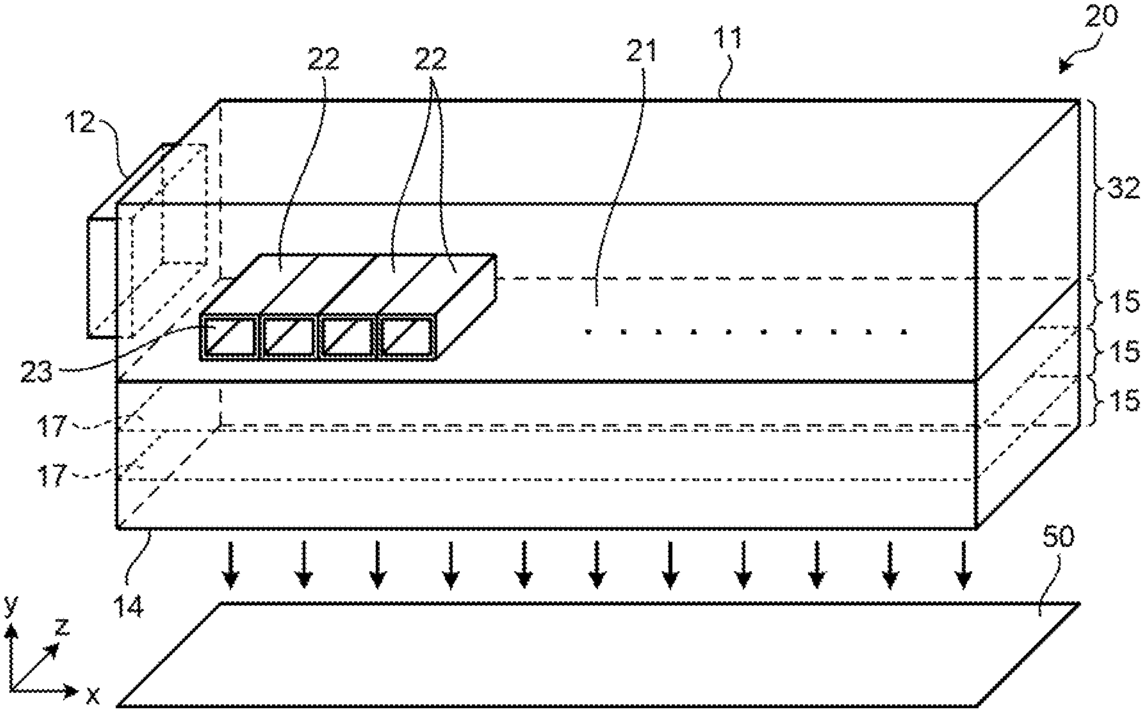
FIG. 8 is a schematic perspective view of the gas blowoff nozzle illustrated in FIG. 7.

A gas blowoff nozzle according to another embodiment of the present invention will be described next. In the gas blowoff nozzle 20 of the embodiment described above, the upper pressure equalizing chamber 13 is formed in a tapered shape in which the height of the upper pressure equalizing chamber 13 is decreased along the longitudinal direction of the nozzle when viewed from the gas supply port 12 side. In the present invention, however, the upper pressure equalizing chamber is not limited to having a tapered shape. A gas blowoff nozzle 30 according to another embodiment of the present invention illustrated in FIG. 7 has the same constitution as that of the gas blowoff nozzle 20 illustrated in FIG. 2 and FIG. 3, but differs from the gas blowoff nozzle 20 illustrated in FIG. 2 and FIG. 3 in including an upper pressure equalizing chamber 32 the height of which is constant along the longitudinal direction of the nozzle. As is the case with those illustrated in FIG. 5, the adjacent tubular bodies 22 are provided so as to come into contact with each other. FIG. 8 is a schematic perspective view for illustrating the constitution of the gas blowoff nozzle 30 illustrated in FIG. 7.

In the gas blowoff nozzles 20 and 30 based on the present invention that have been described above, the shape of each gas circulation hole 24 is not particularly limited as long as the gas circulation hole 24 causes the upper pressure equalizing chamber 13 to communicate with the lower pressure equalizing chambers 15 or the gas blowoff face 14, but the gas circulation hole 24 preferably has a slit shape extending in the longitudinal direction of the nozzle, as illustrated in FIG. 4 or FIG. 6. Assume that the opening area of the gas circulation hole 24 is $S_1$ for a tubular body 22 and the area of the face that comes into contact with the partition plate 21 except for the faces of the wall surfaces of the tubular body 22 that come into contact with the partition plate is $S_2$, the opening ratio $S_1/S_2$ is preferably equal to or less than 0.85.

The gas blowoff nozzles 20 and 30 based on the present invention are configured so that the difference between the maximum value and the minimum value of the blowoff velocity when the distribution of the velocity blowing off the gas along the longitudinal direction of the nozzle is obtained is roughly equal to or less than 14%, preferably equal to or less than 11%, with respect to the average blowoff velocity. However, depending on the type of the resin film 50 on which gas is blown, the difference between the maximum value and the minimum value may be greater than the foregoing values, and is not particularly limited. The velocity of the gas blown off from the blowoff face 14 preferably falls within a range greater than 0 m/s to equal to or less than 20 m/s, and more preferably falls within a range greater than 0 m/s to equal to or less than 7 m/s.

The gas blowoff nozzles 20 and 30 based on the present invention are provided inside a drying furnace or a tenter oven, for example, and is used for blowing gas such as air or nitrogen, on the surface of the resin film 50 when a coated film is manufactured. As a specific example, the gas blowoff nozzles 20 and 30 are used to apply a coating fluid to the resin film 50, and then blow air on the resin film 50 inside a drying furnace and dry the coating. By using the gas blowoff nozzles 20 and 30 based on the present invention inside a drying furnace or a tenter oven when a coated film is manufactured, at least one of the following advantages can be obtained:

(1) a coated film can be obtained that has uniform surface roughness in the width direction of the film;

(2) a coated film can be obtained that has uniform thickness in the width direction of the film;

(3) a coated film can be obtained in which, in a case in which micropores are formed on the film, the micropores are formed that are uniform in the width direction of the film;

(4) flapping is reduced when a film is conveyed, and occurrence of breakage of the film is reduced, whereby the yield is improved;

(5) a coated film can be obtained that has uniform adhesion of dried coating to a resin film in the width direction of the film; and (6) a coated film can be obtained that has no defect in appearance.

EXAMPLES

The present invention will be described in more detail below in accordance with examples.

Example 1

In the gas blowoff nozzle 20 having the constitution illustrated in FIG. 2 and FIG. 3, analyses were performed through simulation for the tubular bodies 22 having the sectional shape of a triangle as illustrated in FIG. 6. In the analyses, general-purpose thermal fluid analysis software "STAR-CCM (ver. 11.04)" (manufactured by IDAJ Co., LTD.) that is commercially available was used to perform steady calculations. A k-c turbulent flow model was used to handle turbulent flows, and the wall law was used to handle turbulent boundary layers near the walls. The software mentioned above analyzes the Navier-Stokes equations, which are hydrodynamical equations of motion, by the finite volume method. Any desired thermal fluid analysis software may be used that can perform the same analysis. An analytic space was set up that imitates the passage in the interior of the nozzle casing. The length of the upper pressure equalizing chamber 13 in the longitudinal direction of the nozzle was set to be 1530 mm, the length thereof in the width direction of the nozzle was set to be 100 mm, and the height of the gas supply port 12 was set to be 200 mm. For the gas supply port 12, a boundary condition was set so that dry air at room temperature (300 K) flows into the analytic space at a flow velocity of 3.0 m/s. The gas blowoff face 14 was to be a pressure boundary, atmospheric pressure (0.1 MPa) was set for the boundary condition.

Figure 9:
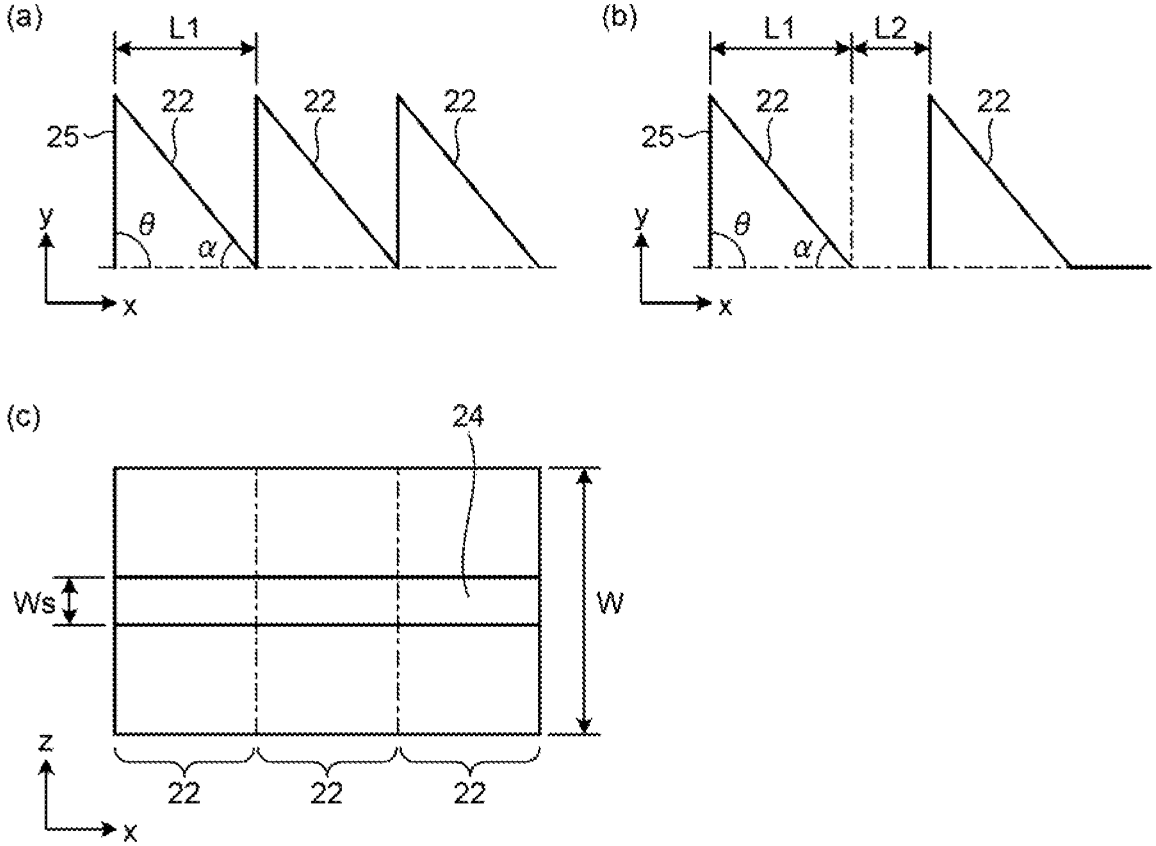
FIGS. 9(*a*) to 9(*c*) are views illustrating dimensions and angles of parts in the tubular bodies.

In the simulation, the tubular bodies 22 were arranged continuously along the longitudinal direction of the nozzle, a distance L2 between adjacent tubular bodies 22 in the longitudinal direction of the nozzle was set to be 0 mm, as illustrated in FIG. 9(*b*), and the tubular bodies were arranged throughout the full length in the longitudinal direction of the nozzle. As illustrated in FIG. 9(*a*), the interior angles that two wall surfaces that rise from the partition plate 21 form with the partition plate 21 (indicated by the dot-and-dash line FIG. 9(*a*)) in each of the tubular bodies 22 was set to be θ and α. The tubular body 22 has the two wall surfaces that rise from the partition plate 21, and the angle θ is an interior angle that the wall surface 25 on the gas supply port side forms with the partition plate, and the angle α is an interior angle that the wall surface that is not on the gas supply port side forms with the partition plate. The length L1 of each tubular body 22 along the longitudinal direction of the nozzle was set to be 15 mm. The thickness of the two wall surfaces was set to be zero for this simulation. Then, when the angle θ and the angle α were changed, the velocity distribution of gas blown off from the blowoff face was obtained along the longitudinal direction of the nozzle. The difference between the maximum value and the minimum value of the thus obtained blowoff velocity divided by the average blowoff velocity was to be a variation R. The variation R of the velocity being smaller is a favorable result. Evaluation was made on the basis of the following: if the variation R is equal to or less than 7%, "⊙" (excellent); greater than 7% and equal to or less than 11%, "○" (good); greater than 11% and equal to or less than 14%, "Δ" (practically no problem); and greater than 14%, "X" (poor). Table 1 shows the results.

TABLE 1

| θ [°] | α [°] | R [%] | Judgment |
|---|---|---|---|
| 45 | 45 | 14.0 | X |
| 55 | 54.1 | 12.5 | Δ |
| 60 | 54.1 | 10.3 | ○ |
| 70 | 54.1 | 9.2 | ○ |
| 75 | 54.1 | 6.0 | ⊙ |
| 80 | 54.1 | 6.3 | ⊙ |
| 90 | 54.1 | 6.0 | ⊙ |
| 95 | 54.1 | 6.2 | ⊙ |
| 100 | 54.1 | 7.8 | ○ |
| 110 | 54.1 | 9.3 | ○ |
| 120 | 54.1 | 11.3 | Δ |

It has been shown by Table 1 that, the angle θ being between 55° and 120° inclusive has practically no problem, the angle θ being between 60° and 110° inclusive is preferable, and the angle θ being between 75° and 95° inclusive is more preferable.

Example 2

In the gas blowoff nozzle 20 having the constitution illustrated in FIG. 2 and FIG. 3, analyses were performed through simulation for the tubular bodies 22 having the sectional shape of a triangle as illustrated in FIG. 6, as is the case with Example 1. The angle θ, the angle α, and the length L1 were defined as is the case with Example 1. As illustrated in FIG. 9(*b*), the distance L2 between adjacent tubular bodies 22 in the longitudinal direction of the nozzle was changed, and the variation R was obtained as is the case with Example 1 to make evaluation. Table 2 shows the results.

TABLE 2

| θ [°] | α [°] | L1 [mm] | L2 [mm] | L2/L1 | R [%] | Judgment |
|---|---|---|---|---|---|---|
| 90 | 53.1 | 15 | 0 | 0 | 6.0 | ⊙ |
| 90 | 53.1 | 15 | 7.5 | 0.5 | 6.3 | ⊙ |
| 90 | 53.1 | 15 | 12 | 0.8 | 8.7 | ○ |
| 90 | 53.1 | 15 | 15 | 1 | 10.3 | ○ |
| 90 | 53.1 | 15 | 22.5 | 1.2 | 11.8 | Δ |
| 90 | 53.1 | 15 | 30 | 1.5 | 13.6 | Δ |

It has been shown by Table 2 that, regarding the length L1 of the tubular body in the longitudinal direction of the nozzle and the distance L2 between tubular bodies 22, L2/L1 being equal to or less than 1.5 has practically no problem, L2/L1 being equal to or less than 1 is preferable, and L2/L1 being equal to or less than 0.5 is more preferable.

Example 3

Analyses were performed through simulation as is the case with Example 1, and the opening ratio of the gas circulation hole at the underside of the tubular body 22 was examined. In the gas blowoff nozzle (where, θ=90°, α=53.1°, and L1=15 mm) used in Example 1, a width W of the tubular body 22 in the width direction of the nozzle was set to be 60 mm, and the width of the gas circulation hole 24 formed as a slitted orifice was to be Ws, as illustrated in FIG. 9(*c*). The variation R of the velocity when Ws was changed was obtained as is the case with Example 1 to make a judgment. Because the gas circulation hole 24 is formed throughout the full length of the underside of the tubular body 22 in the longitudinal direction of the nozzle, Ws/W is the ratio ($S_1/S_2$), for a tubular body 22, of the area $S_1$ of the gas circulation hole 24 to the area $S_2$ of the underside of the tubular body 22 (the sum of the area of the opening part and the non-opening part at the underside thereof), in other words, the opening ratio. Table 3 shows the results.

TABLE 3

| Ws [mm] | W [mm] | Opening ratio ($S_1/S_2$) | R [%] | Judgment |
|---|---|---|---|---|
| 8 | 60 | 0.13 | 6.0 | ⊙ |
| 16 | 60 | 0.27 | 5.6 | ⊙ |
| 30 | 60 | 0.50 | 5.6 | ⊙ |
| 50 | 60 | 0.83 | 5.8 | ⊙ |
| 55 | 60 | 0.92 | 8.4 | ○ |
| 60 | 60 | 1.00 | 10.0 | ○ |

It has been shown by Table 3 that, even in a case in which the opening ratio is 1.0, in other words, the entire underside of the tubular body 22 is the gas circulation hole 24, the variation R of the velocity is 10%, resulting in "good", and if the opening ratio is equal to or less than 0.85, R is equal to or less than 7%, resulting in "excellent". That is, it has been shown that the opening ratio being equal to or less than 0.85 is preferable.

REFERENCE SIGNS LIST

10, 20, 30 gas blowoff nozzles
11 casing
12 gas supply port
13, 32 upper pressure equalizing chambers
14 gas blowoff face
15 lower pressure equalizing chamber
16, 17, 21 partition plates
22 tubular body
23 orifice

The invention claimed is:

1. A gas blowoff nozzle used for blowing gas on a surface of a resin film, the gas blowoff nozzle comprising:

a casing provided such that a longitudinal direction of the gas blowoff nozzle extends in a width direction of the resin film, the casing including, on a lateral face thereof opposing the resin film, a gas blowoff face that blows off gas;

a gas supply port provided to one end of the casing, the gas supply port supplying gas along the longitudinal direction of the nozzle; and one or more pressure equalizing chambers communicating with the gas supply port and the gas blowoff face, wherein one pressure equalizing chamber of the one or more pressure equalizing chambers includes a partition plate constituting a face on a side of the gas blowoff face, the partition plate including a plurality of tubular bodies arranged on the partition plate along the longitudinal direction of the nozzle such that an axial direction of each of the tubular bodies is orthogonal to the longitudinal direction of the nozzle, each of the tubular bodies having orifices on both ends, in each of the tubular bodies, an angle θ that a wall surface on a side closer to the gas supply port, out of wall surfaces that rise from the partition plate, forms with the partition plate is 90° as an interior angle in a sectional shape of each of the tubular bodies, resulting in variation of a gas velocity along the longitudinal direction of the nozzle of ≤ 7% and a gas circulation hole is provided on a face of each of the tubular bodies that comes into contact with the partition plate, the gas circulation hole passing through the face and the partition plate.

2. The gas blowoff nozzle according to claim 1, wherein the pressure equalizing chamber in which the tubular bodies are arranged is a pressure equalizing chamber adjacent to the gas supply port.

3. The gas blowoff nozzle according to claim 1, wherein, where $S_1$ is an opening area of the gas circulation hole for one of the tubular bodies, and $S_2$ is an area of the face that comes into contact with the partition plate except for faces of the wall surfaces of the tubular body that come into contact with the partition plate, the wall surfaces rising from the partition plate, an opening ratio $S_1/S_2$ is equal to or less than 0.85.

4. The gas blowoff nozzle according to claim 1, wherein the gas circulation hole is a slit extending in the longitudinal direction of the nozzle.

5. The gas blowoff nozzle according to claim 1, wherein a face that each of the orifices of the tubular body forms is a face that is parallel to the longitudinal direction of the nozzle and that is also substantially perpendicular to the partition plate.

6. The gas blowoff nozzle according to claim 1, wherein, where L1 is a length along the longitudinal direction of the nozzle on the face of the tubular body that comes into contact with the partition plate, and L2 is a distance between the adjacent tubular bodies in the longitudinal direction of the nozzle, L2/L1 is equal to or less than 1.0.

7. A furnace comprising the gas blowoff nozzle according to claim 1, wherein the furnace applies heating treatment by blowing heating gas from the gas blowoff nozzle to a resin film.

8. A method for manufacturing a coated film, the method comprising blowing gas to a surface of a resin film by using the gas blowoff nozzle according to claim 1.

9. The method for manufacturing a coated film according to claim 8, wherein the gas is heating gas.

10. The gas blowoff nozzle according to claim 1, wherein a plurality of the tubular bodies are arranged in parallel so as to come into contact with each other or be separated from each other.

* * * * *